United States Patent
Hsu et al.

(10) Patent No.: US 9,087,374 B2
(45) Date of Patent: Jul. 21, 2015

(54) AUTOMATIC AIRVIEW CORRECTION METHOD

(75) Inventors: Li-You Hsu, Changhua County (TW); Yu-Sheng Liao, Changhua County (TW); Tzu-Chien Hsu, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 442 days.

(21) Appl. No.: 13/597,662

(22) Filed: Aug. 29, 2012

(65) Prior Publication Data

US 2014/0010411 A1 Jan. 9, 2014

(30) Foreign Application Priority Data

Jul. 3, 2012 (TW) .............................. 101123856 A

(51) Int. Cl.
*G06K 9/00* (2006.01)
*G06T 7/00* (2006.01)
*G06T 3/40* (2006.01)

(52) U.S. Cl.
CPC .......... *G06T 7/0018* (2013.01); *G06K 9/00805* (2013.01); *G06T 3/4038* (2013.01); *G06T 7/0028* (2013.01); *G06T 2207/30208* (2013.01); *G06T 2207/30252* (2013.01)

(58) Field of Classification Search
CPC .......... G06T 2207/30208; G06T 2207/30252; G06T 3/4038; G06T 7/0018; G06T 7/0028
See application file for complete search history.

(56) References Cited

U.S. PATENT DOCUMENTS

2006/0029255 A1* 2/2006 Ozaki .......................... 382/104
2010/0149333 A1* 6/2010 Yang .............................. 348/143

FOREIGN PATENT DOCUMENTS

| TW | 200927537 | 7/2009 |
| TW | 201103787 | 2/2011 |

\* cited by examiner

*Primary Examiner* — Barry Drennan
*Assistant Examiner* — Amandeep Saini
(74) *Attorney, Agent, or Firm* — Muncy, Geissler, Olds & Lowe, P.C.

(57) ABSTRACT

An automatic airview correction method comprises steps: moving a vehicle to an airview alignment pattern; capturing a plurality of airview alignment images of the surroundings of the vehicle; correcting distortion of the airview alignment images to obtain a plurality of corrected images; performing alignment compensation on the corrected images; searching for corner points of the corrected images and converting view points to obtain a plurality of view angle-converted images; and searching for corner points of the view angle-converted images, and seaming the view angle-converted images to form a panoramic airview and obtain parameters corresponding to the panoramic airview. The present invention can automatically align images and can also automatically detect corner points to seam the images of the surroundings of a vehicle, whereby to form a panoramic airview.

8 Claims, 10 Drawing Sheets

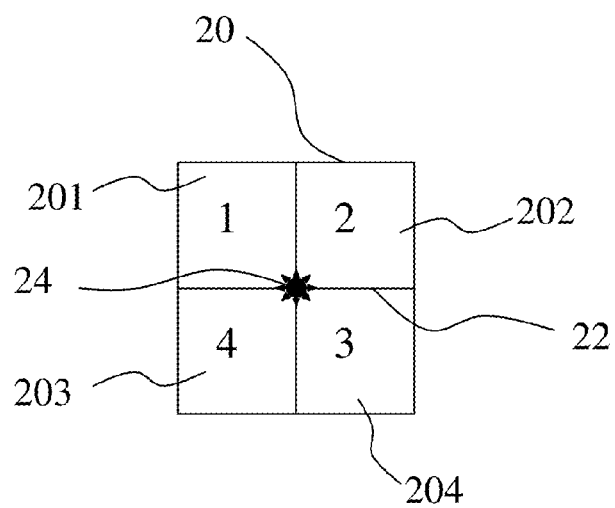
Fig.5a
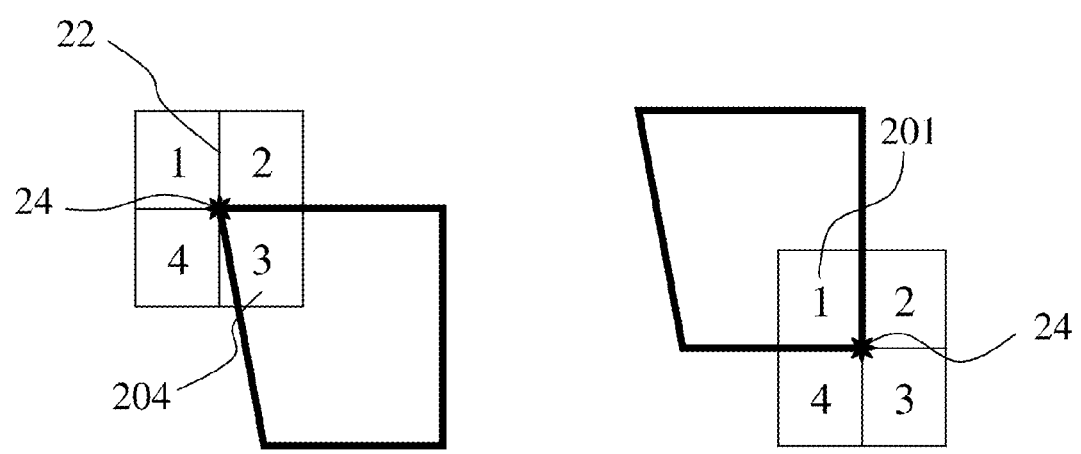
Fig.5b
Fig.5c

AUTOMATIC AIRVIEW CORRECTION METHOD

BACKGROUND OF THE INVENTION

1. Field of the Invention

The present invention relates to an airview seaming technology, particularly to a method to automatically correct the airviews of the surroundings of a vehicle.

2. Description of the Related Art

Digital cameras are fast falling in price and have been widely used as auxiliary instruments of vehicles. As a driver is unlikely to watch several images simultaneously, some manufacturers have integrated several primitive images into a 2D surrounding airview, which is more suitable for human vision. The conventional technology uses three steps to achieve a panoramic airview, including distortion correction, view point conversion, and image seaming. However, the conventional technology needs human decisions and manual parameter setting in undertaking the three steps. Therefore, the conventional technology is inconvenient and time-consuming. Besides, the precision of the panoramic airview correction is likely to be degraded by errors of camera installation.

A Taiwan patent No. I320756 disclosed a technology, which uses a fisheye lens to capture surrounding images of a vehicle and uses distortion correction, view point conversion, and image seaming to obtain a single piece of airview, wherein a planar homography matrix is used to convert the view points. The prior art finds out identical features of the overlapped regions of the images captured by two different cameras for seaming the images. However, the present invention is characterized in using a blocking matching technology to automatically search for the feature points, whereby to realize the automation of airview correction. Further, the present invention can automatically compensate the installation errors of cameras.

A Taiwan patent No. 201103787 disclosed a technology, which uses a mapping table to correct image distortions, convert view points and seam images to obtain an airview. However, the prior art needs human decisions and manual parameter setting in image distortion correction, view point conversion and image seaming. Contrarily, the present invention provides an automatic corner point searching device and an automatic corner point matching device to replace human decision and manual parameter setting, whereby to achieve full automatic airview correction and higher-precision airviews.

Thus, the present invention proposes an automatic airview correction method to solve the abovementioned problems.

SUMMARY OF THE INVENTION

The primary objective of the present invention is to provide an automatic airview correction method, which can correct the errors of images automatically and can increase precision of image seaming, and which can automatically search for corner points to realize automation of image distortion correction, view point conversion, and multiple cycles of image seaming.

Another objective of the present invention is to provide an automatic airview correction method, which can automatically perform multiple cycles of image seaming, whereby is obtained a more complete and clearer airview.

A further objective of the present invention is to provide an automatic airview correction method applicable to various airview correction systems.

To achieve the abovementioned objectives, the present invention proposes an automatic airview correction method, which comprises steps: moving a vehicle to an airview alignment pattern; capturing a plurality of airview alignment images from the surroundings of the vehicle; correcting distortion of the airview alignment images to obtain a plurality of corrected images; performing alignment compensation on the corrected images; searching for corner points of the corrected images and converting view angles to obtain a plurality of view angle-converted images; and searching for corner points of the view angle-converted images, and seaming the view angle-converted images to form a panoramic airview and obtain parameters corresponding to the panoramic airview.

Below, embodiments are described in detail to make easily understood the objectives, technical contents, characteristics and accomplishments of the present invention.

BRIEF DESCRIPTION OF THE DRAWINGS

FIGS. 5a-5c schematically show the feature of a corner point and the search of the corner point according to one embodiment of the present invention;

DETAILED DESCRIPTION OF THE INVENTION

Figure 1:
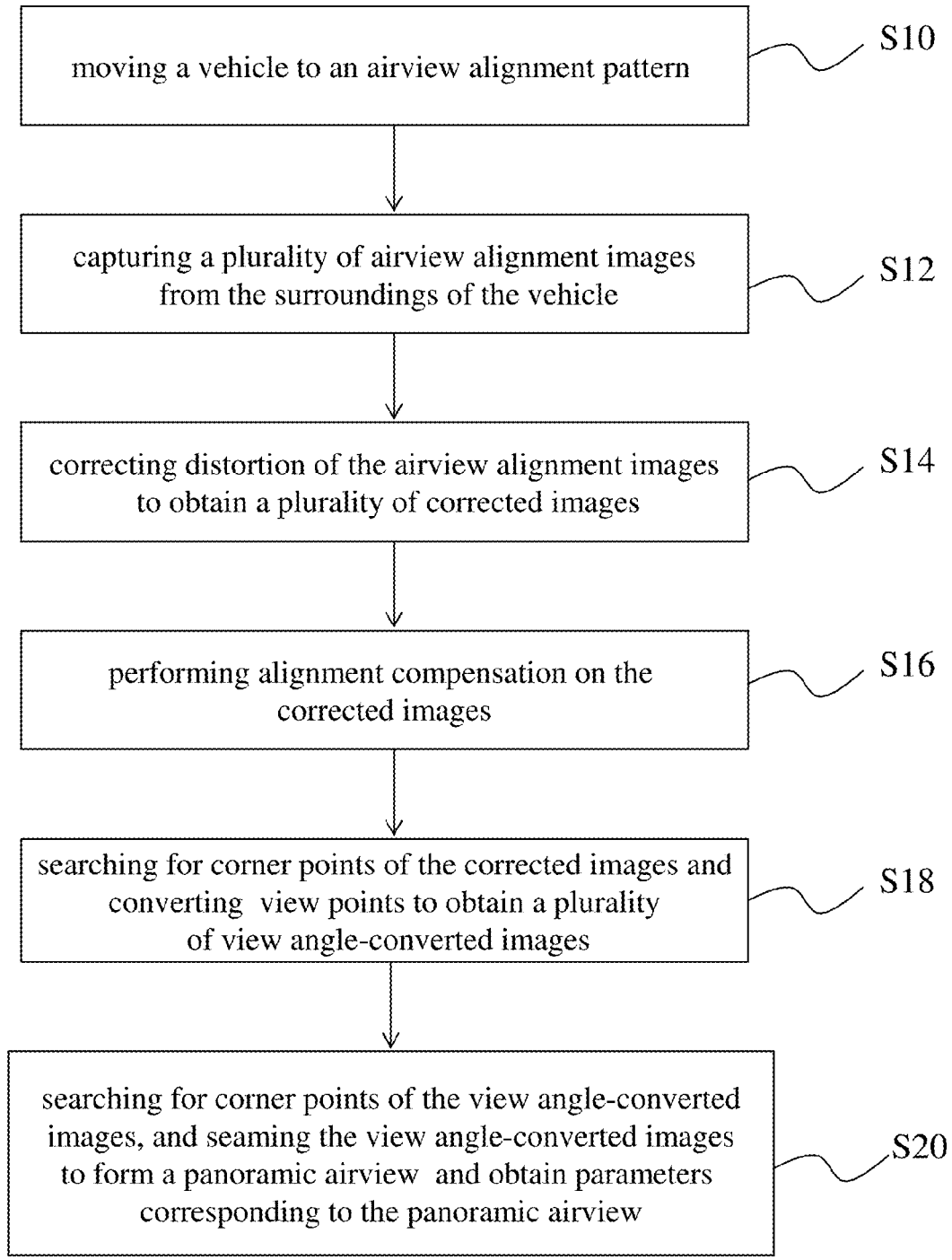
FIG. 1 shows a flowchart of an automatic airview correction method according to one embodiment of the present invention.
Figure 2A:
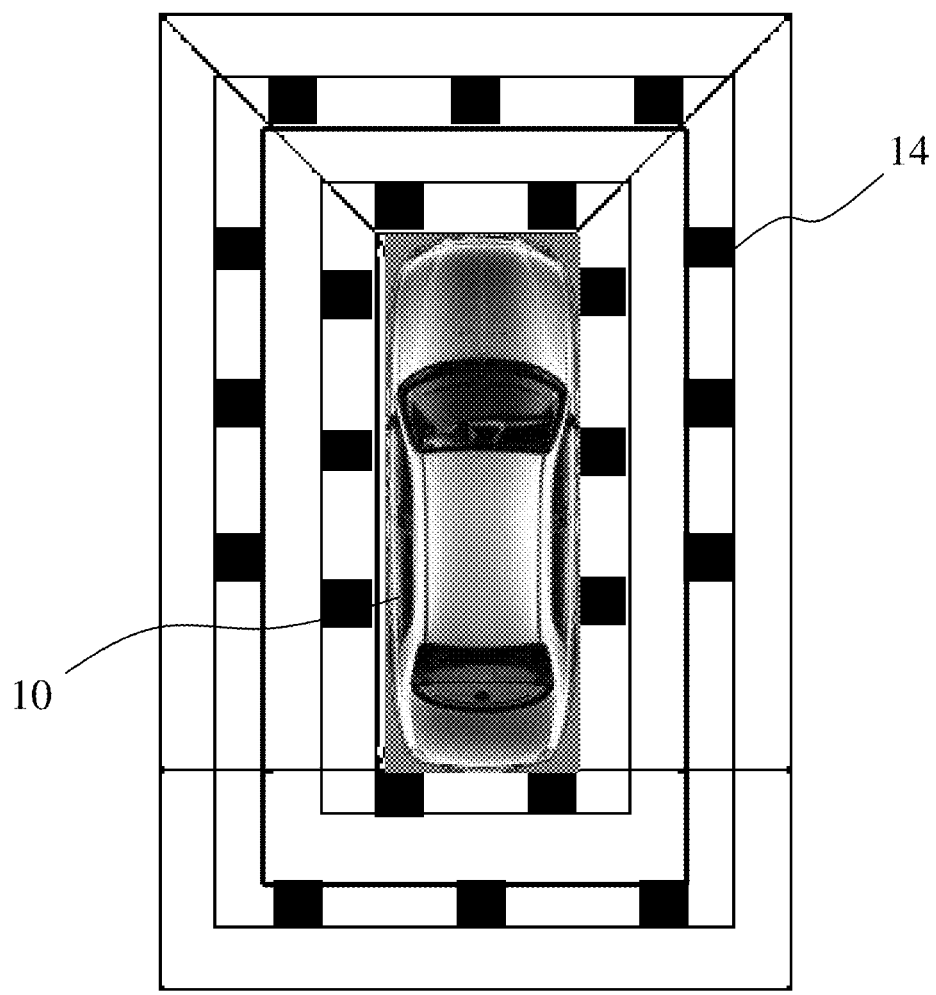
FIGS. 2a-2h schematically show steps of an automatic airview correction method according to one embodiment of the present invention.
Figure 2B:
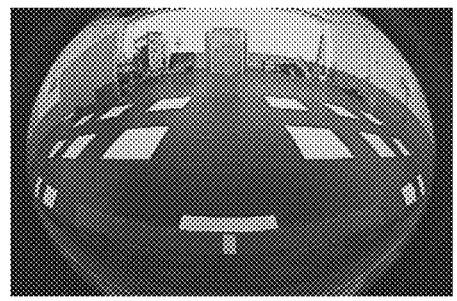
Figure 2C:
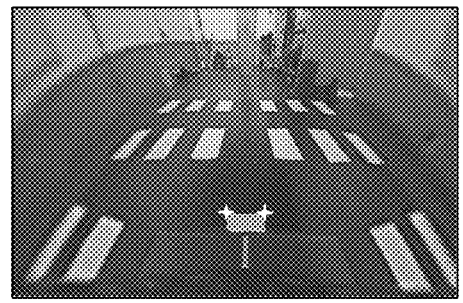
Figure 2D:
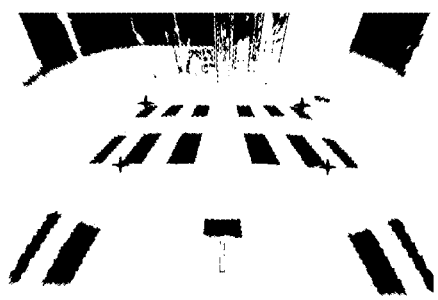
Figure 2E:
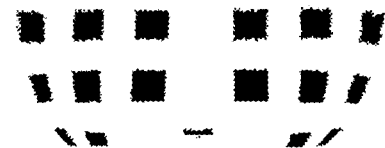
Figure 2F:
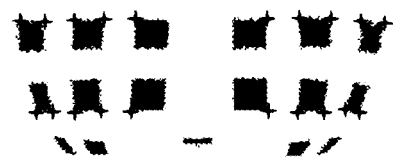
Figure 2G:
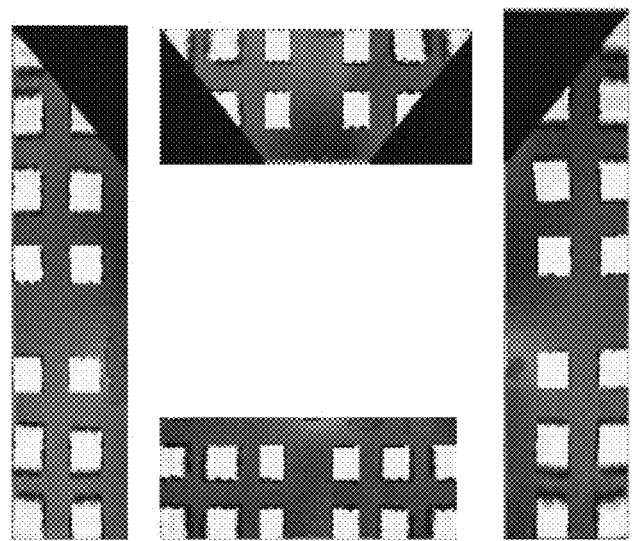
Figure 2H:
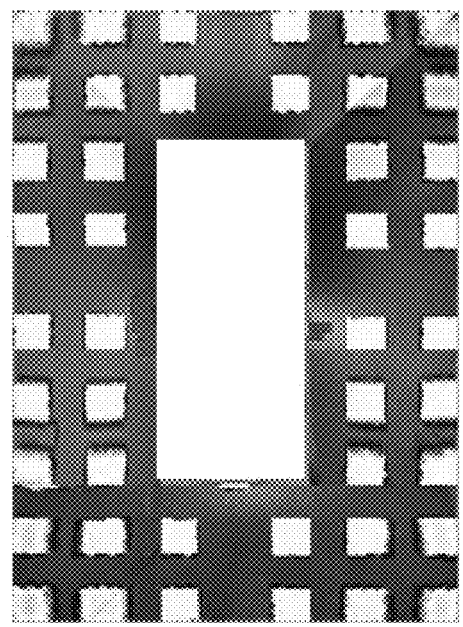

Refer to FIG. 1 and FIGS. 2a-2h. In Step S10, move a vehicle 10 to an airview alignment pattern 14, as shown in FIG. 2a. The airview alignment pattern 14 is a template where a correction pattern is drawn. The airview alignment pattern 14 may be place in a correction field. Next, in Step S12, use a fisheye lens to capture a plurality of airview alignment images from the surroundings of the vehicle 10. In this embodiment, only the image of the region before the vehicle 10 is used to exemplify the airview alignment images, as shown in FIG. 2b. The images captured by the fisheye lens are distorted images. Next, in Step S14, use a fisheye correction method to correct the distorted airview alignment images captured by the fisheye lens to obtain undistorted airview alignment images (corrected images), as shown in FIG. 2c. Next, in Step S16, perform alignment compensation on the corrected images and convert them into binary images (as shown in FIG. 2d) to accelerate image processing. Next, in Step S18, automatically search for the corner points of the corrected images and use a space transformation method to convert the view points to obtain a plurality of view angle-converted images, as shown in FIG. 2e. Next, in Step S20, search for the corner points of the view angle-converted images (as shown in FIG. 2f), and use a bilinear method to seam the view angle-converted images into a panoramic airview (as shown in FIG. 2g). As the distortions of the view angle-converted images are corrected simultaneously in seaming images, the seamed image is exempt from distortions. As the present invention adopts an automatic corner point search method, the present invention can undertake more cycles of image seaming to obtain a clearer panoramic airview, as shown in FIG. 1h. Then, obtain and record the parameters corresponding to the panoramic air view. When intending to watch the panoramic airview, the user utilizes the parameters to replay the panoramic airview.

Figure 3:
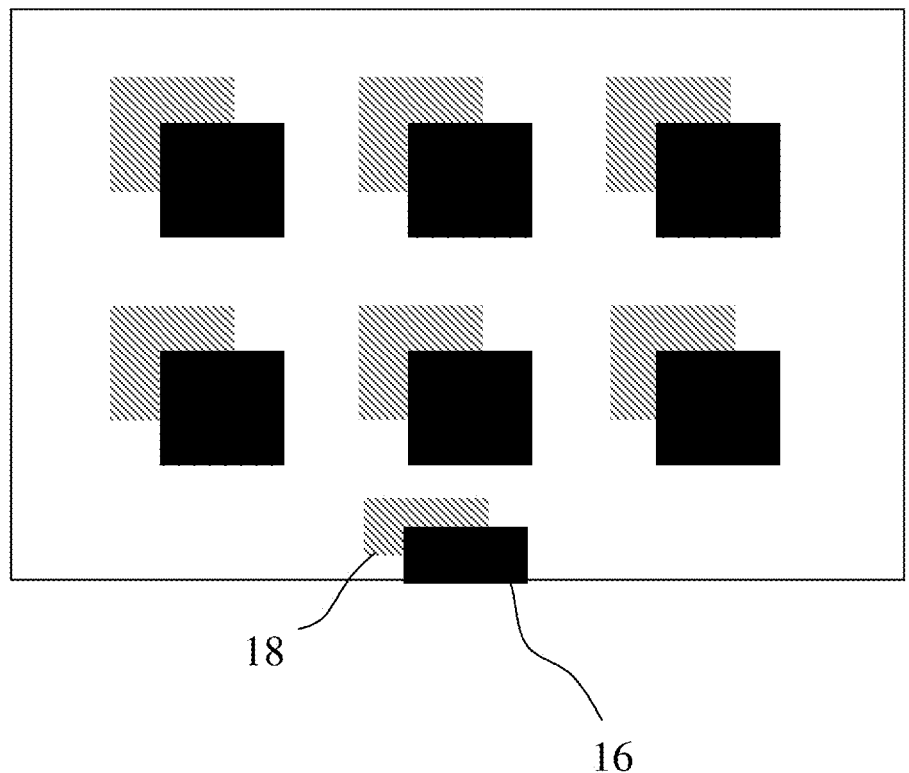
FIG. 3 schematically shows the image alignment of an automatic airview correction method according to one embodiment of the present invention.

As the installation position of a camera has an error inevitably, the captured region is more or less deviated from the intended region. The precision of seaming images varies with the installation errors of cameras. Therefore, the present invention proposes an image alignment method to increase precision of panoramic airviews. Below is described the image alignment method. Refer to FIG. 3. The image alignment method compares alignment reference squares 16 of the airview alignment pattern 14 with the alignment reference squares 18 of a physical image to evaluate the deviation of the physical image. Then, the present invention compensates the deviation of the image. Thereby are compensated the installation errors of cameras and obtained clearer panoramic airviews.

Figure 4:
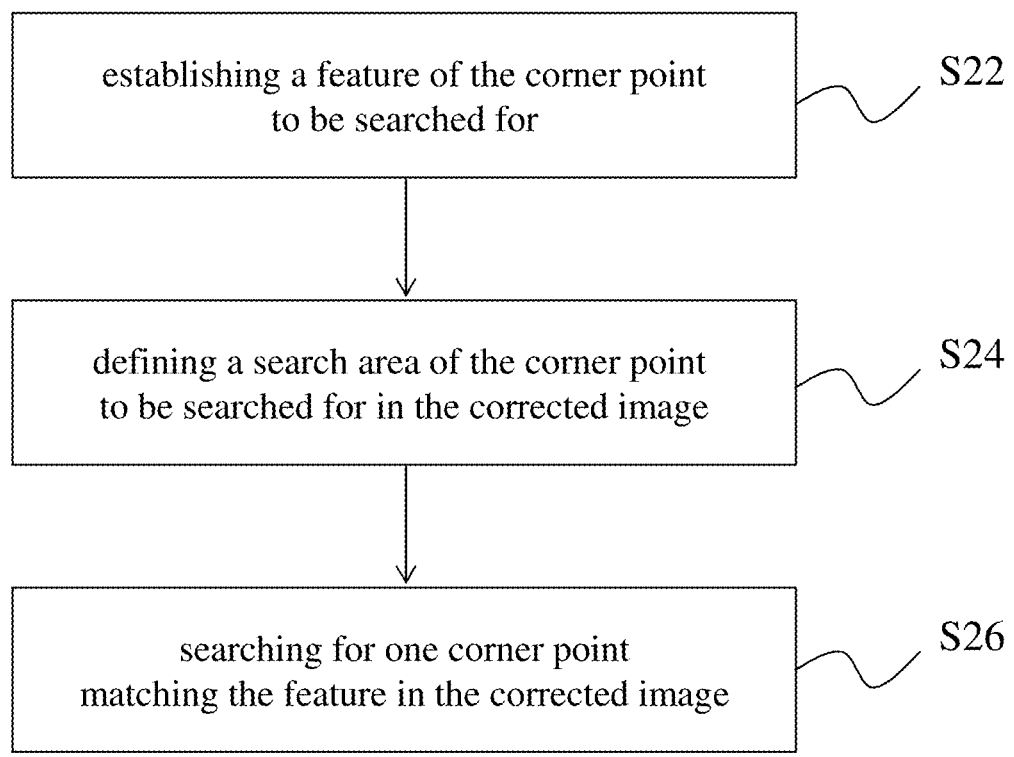
FIG. 4 shows a flowchart of an automatic corner point search method according to one embodiment of the present invention.

The present invention further uses an automatic corner point search method to realize full automation of airview synthesis. Below is described the automatic corner point search method. Refer to FIG. 4. In Step S22, define the feature of a corner point. Refer to FIG. 5a. A reticule 22 is formed on a corner point search square 20 to partition the corner point search square 20 into four blocks numbered in sequence. In FIG. 5a, the blocks 201, 202, 204 and 203 are respectively numbered with 1, 2, 3, and 4 clockwise. Then, the present invention establishes the gray levels of the blocks of the corner point to be searched for, and uses the gray levels of the blocks as the feature to recognize the corner point. Next, in Step S24, define the area to search for the corner point in the corrected image or the view angle-converted image according to the deviation of the alignment reference square 18. Next, in Step S26, search for the corner point matching the feature of the intended corner point in the corrected image or the view angle-converted image. Refer to FIG. 5b. The center 24 of the reticule 22 is preset to be the center to search for the pixels matching the gray levels (feature) of the four blocks in the search area. The point whose surrounding pixels match the feature is regarded as the corner point. In FIG. 5b, the corner point search square 20 features that Block 3 (204) has a gray level different from the gray level of the other three blocks, and the upper left corner point matches the feature. In FIG. 5c, the corner point search square 20 features that Block 1 (201) has a gray level different from the gray level of the other three blocks, and the lower right corner point matches the feature. Thereby, the present invention can find out the corner points in the corrected image or the view angle-converted image.

The present invention is characterized in replacing the conventional human decision and manual parameter setting with the automatic image alignment method and automatic corner point search method. Therefore, the present invention can realize a fully automatic airview correction system. The automatic corner point search method of the present invention can promote the precision of the panoramic airview. Further, the present invention can undertake multiple cycles of image seaming to form a clearer panoramic airview.

After having obtained the parameters of a panoramic airview, the present invention can further apply to a panoramic airview-based obstacle detection method. The parameters of panoramic airviews can be used to convert a plurality of primitive images into a plurality of independent panoramic airviews. The correlation of the images of the overlapped sections of two independent panoramic airviews is used to detect obstacles. If the correlation is high, it means that none obstacle exists. If the correlation is low, it means that an obstacle appears in the overlapped sections. While detecting an obstacle appearing in the panoramic airview, the system emits a warning signal to remind the driver of the obstacle.

Figure 6A:
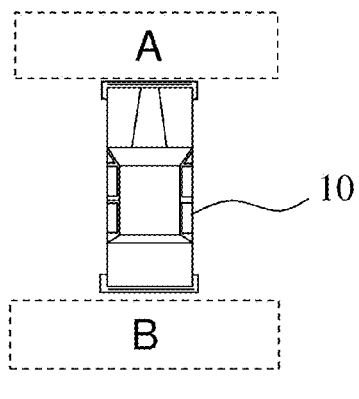
FIGS. 6a-6d schematically show regions whose images are captured by image capture devices according to one embodiment of the present invention.
Figure 6B:
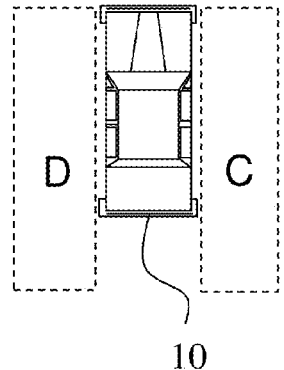
Figure 6C:
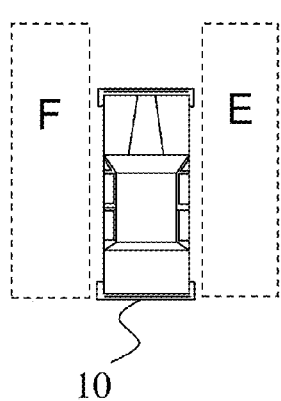
Figure 6D:
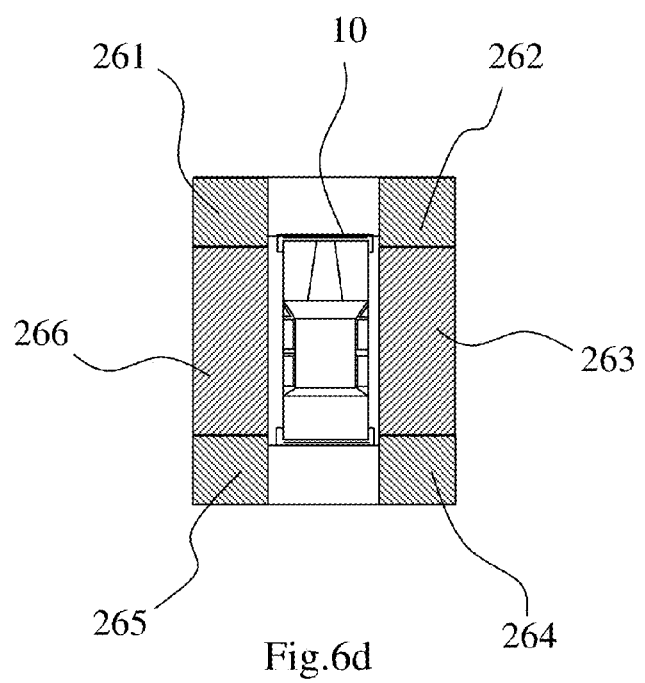
Figure 7:
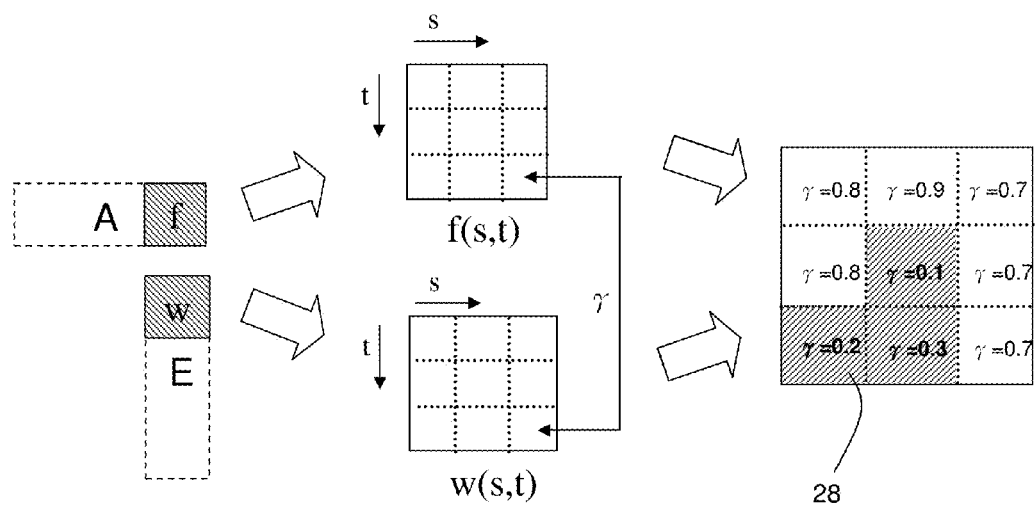
FIG. 7 schematically shows the calculation of the correlation coefficient of overlapped sections according to one embodiment of the present invention.

Below is further described how to compare the overlapped sections of two independent airviews. The present invention uses a plurality of image capture devices to capture the images of the regions surrounding a vehicle and uses the abovementioned automatic airview correction method to convert the captured images into panoramic airviews. Refer to FIGS. 6a-6c. The present invention uses a plurality of image capture devices to capture the images of 6 regions surrounding a vehicle 10 and respectively designated by A, B, C, D, E, and F. Refer to FIG. 6d. Regions A, B, C, D, E, and F include overlapped sections 261, 262, 263, 264, 265, and 266. An image processor respectively converts the primitive images of the 6 regions into independent airviews. An obstacle calculation unit compares the images of the overlapped sections (261, 262, 263, 264, 265, or 266) of each two neighboring panoramic airviews and determines the correlation of the images of the overlapped sections. Refer to FIG. 7. The overlapped section 262 of Region A in FIG. 6a and the overlapped section 262 of Region E in FIG. 6c are used to exemplify the comparison. The gray level of the image of the overlapped section 262 of Region A is expressed by f(s, t). The gray level of the image of the overlapped section 262 of Region E is expressed by w(s, t). The image processor divides the image of each overlapped section into 9 sub-sections and calculates the correlation coefficient γ of the gray levels of the corresponding sub-sections according to the following equation:

$$\gamma = \frac{\sum_s \sum_t [f(s,t) - \overline{f}][w(s,t) - \overline{w}]}{\left\{ \sum_s \sum_t [f(s,t) - \overline{f}]^2 \sum_s \sum_t [w(s,t) - \overline{w}]^2 \right\}^{1/2}}$$

wherein $\overline{f}$ and $\overline{w}$ are respectively the average gray levels of the images of the overlapped sections of Region A and Region E. The equation is to calculate the difference of each two corresponding points of the two overlapped sections and obtain the correlation coefficient γ of the two overlapped sections. If the two overlapped sections are completely identical, the correlation coefficient γ equals 1. If the two overlapped sections are completely different, the correlation coefficient γ equals 0. In the present invention, a correlation coefficient γ of 0.5 is used as a threshold for obstacle judgement. If the correlation coefficient γ is smaller than the threshold, it means that an obstacle exists. In FIG. 7, Areas 28 of the overlapped sections 262 has a correlation coefficient γ of smaller than 0.5 and thus has an obstacle therein. While the surfaces in two overlapped sections are planar and smooth, the panoramic airviews would not be distorted. In such a case, the correlation coefficient γ of the two overlapped sections is higher the threshold 0.5. Thus, none obstacle appears in the overlapped sections. Therefore, the present invention can determine whether an obstacle exists via comparing the overlapped sections of the panoramic airviews.

Figure 8:
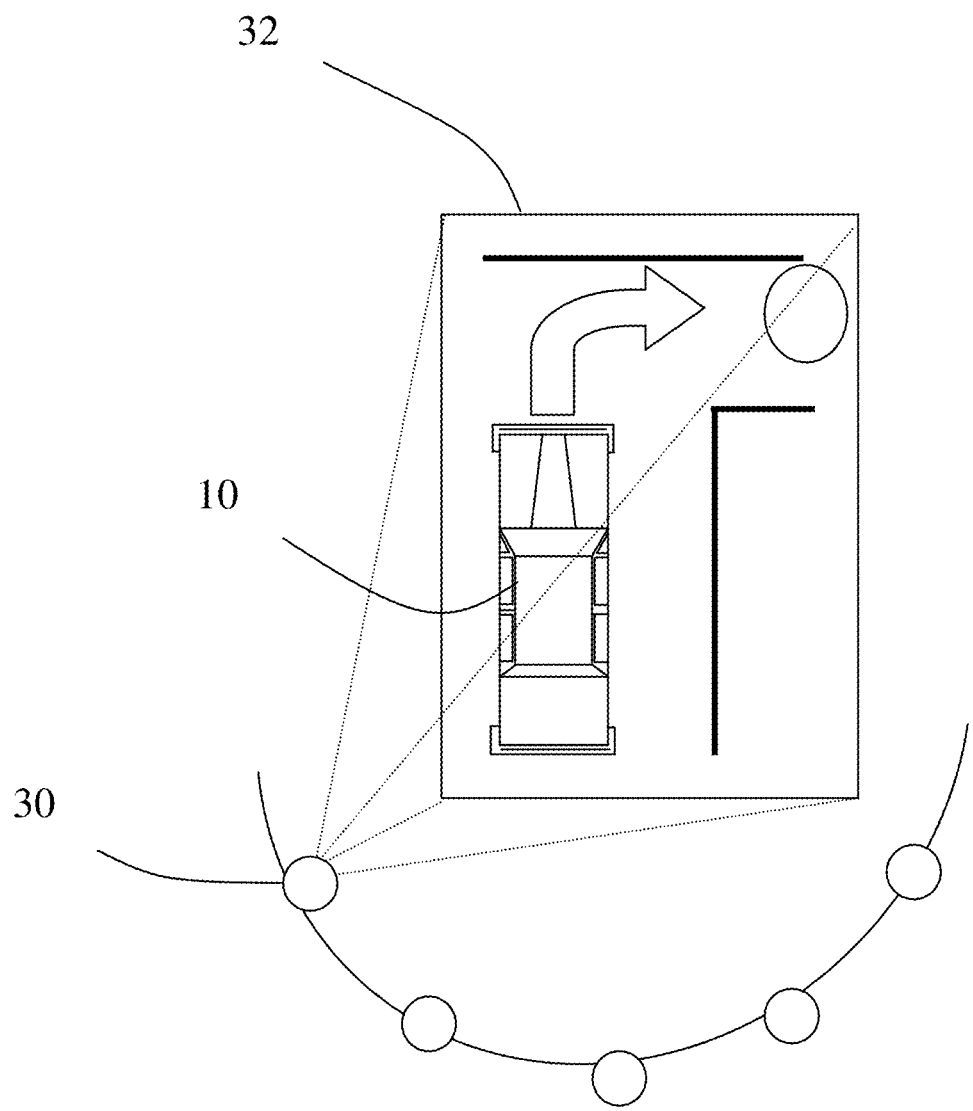
FIG. 8 schematically shows a panoramic airview whose virtual view point is variable according to one embodiment of the present invention.

After obtaining the parameters of the panoramic airviews, the present invention further obtains a relationship between the rotation angle of the steering wheel (by a graduation of such as 5 degrees) and the corresponding virtual view points to shift the panoramic airview from a view point to another view point and implement image transformation, using the spatial information of the cameras in the vehicle body, a virtual view point coordinate transformation matrix, a perspective transformation equation, and an inverse perspective transformation equation. While capturing images, the present invention selects the corresponding panoramic airview parameters according to the rotation angle of the steering wheel. Next, the present invention uses the panoramic airview parameters to fast process the captured images and obtain a panoramic airview. Refer to FIG. 8 for an example. While the driver turns the vehicle 10 to right, the image processor receives a signal from the vehicle 10 and uses a preset parameter transformation to present to the driver a panoramic airview 32 of the region at the front right of the vehicle 10, which is viewed from a virtual view point 30 at the rear left of the vehicle 10. At the same time, the present invention also detects obstacles within the region at the front right of the vehicle 10.

In conclusion, the present invention can correct image errors and search for corner points automatically to realize the automation of image distortion correction, view point conversion, and image seaming. Further, the present invention can undertake multiple cycles of image seaming to obtain a clearer panoramic airview. The method of the present invention can apply to various airview correction systems.

The embodiments described above are only to exemplify the present invention but not to limit the scope of the present invention. Any equivalent modification or variation according to the characteristic or spirit of the present invention is to be also included within the scope of the present invention.

What is claimed is:

1. An automatic airview correction method comprising steps:
    moving a vehicle to an airview alignment pattern;
    capturing a plurality of airview alignment images from a surroundings of said vehicle;
    correcting distortion of said airview alignment images to obtain a plurality of corrected images;
    performing alignment compensation on said corrected images;
    searching for corner points of said corrected images and converting view points to obtain a plurality of view angle-converted images; and
    searching for corner points of said view angle-converted images, and seaming said view angle-converted images to form a panoramic airview and obtain parameters corresponding to said panoramic airview,
    wherein said step of searching for corner points further comprises steps:
    establishing a feature of said corner point to be searched for;
    defining a search area of said corner point to be searched for in said corrected image or said view angle-converted image; and
    searching for one said corner point matching said feature in said corrected image or said view angle-converted image, and
    wherein a reticle is formed on a corner point search square to partition said corner point search square into four blocks, and wherein a center of said reticle is arranged to coincide with a corner point in said corrected image or said view angle-converted image, and wherein gray levels of said blocks are defined as a future for recognizing said corner point.

2. The automatic airview correction method according to claim 1 further comprising a step: recording said parameters corresponding to said panoramic airview.

3. The automatic airview correction method according to claim 1, wherein in said step of performing alignment compensation, an error of said corrected image is compensated according to a deviation of an alignment reference square of said airview alignment image.

4. The automatic airview correction method according to claim 1, wherein after said step of correcting distortion of said airview alignment images, said corrected images are converted into binary images.

5. The automatic airview correction method according to claim 1, wherein in said step of correcting distortion of said airview alignment images, a fisheye correction method is used to correct said airview alignment images into said corrected image free of distortion.

6. The automatic airview correction method according to claim 1, wherein in said step of converting view points, a space transformation method is used to convert said corrected images into said view angle-converted images.

7. The automatic airview correction method according to claim 1, wherein in said step of seaming said view angle-converted images, a bilinear method is used to seam said view angle-converted images into said panoramic airview.

8. The automatic airview correction method according to claim 1, wherein in said step of seaming said view angle-converted images, said view angle-converted images can be seamed into said panoramic airview having a higher definition via correcting distortion of said view angle-converted images.

* * * * *